US010552350B2

(12) United States Patent
Zheng

(10) Patent No.: US 10,552,350 B2
(45) Date of Patent: Feb. 4, 2020

(54) SYSTEMS AND METHODS FOR AGGREGATING DATA PACKETS IN A MOCHI SYSTEM

(71) Applicant: Marvell World Trade Ltd., St. Michael (BB)

(72) Inventor: Jerry Hongming Zheng, Dublin, CA (US)

(73) Assignee: Marvell World Trade Ltd., St. Michael (BB)

( * ) Notice: Subject to any disclaimer, the term of this patent is extended or adjusted under 35 U.S.C. 154(b) by 124 days.

(21) Appl. No.: 15/220,916

(22) Filed: Jul. 27, 2016

(65) Prior Publication Data
US 2017/0041225 A1 Feb. 9, 2017

Related U.S. Application Data

(60) Provisional application No. 62/218,296, filed on Sep. 14, 2015, provisional application No. 62/200,452, (Continued)

(51) Int. Cl.
*H04L 29/06* (2006.01)
*G06F 13/24* (2006.01)
(Continued)

(52) U.S. Cl.
CPC ............ *G06F 13/24* (2013.01); *G06F 1/08* (2013.01); *G06F 3/0604* (2013.01);
(Continued)

(58) Field of Classification Search
CPC ...... H04W 4/006; H04L 69/22; H04L 49/109; H04L 1/1835; H04L 67/2833; H04N 21/24; H04N 21/64738
See application file for complete search history.

(56) References Cited

U.S. PATENT DOCUMENTS 6,412,013 B1 * 6/2002 Parthasarathy ..... H04L 12/5602
375/E7.014
6,760,791 B1 7/2004 Askar
(Continued)

FOREIGN PATENT DOCUMENTS

| EP | 1458166 | 9/2004 |
| EP | 2314024 | 4/2011 |
| WO | WO-2015/089058 | 6/2015 |

OTHER PUBLICATIONS

Wong, W., "Q&A: A Deeper Look at Marvell's MoChi Technology," *Electronic Design*, 4 pages (Jun. 6, 2016) (accessed on Jun. 6, 2016 at http://electronicdesign.com/digital-ics/qa-deeper-look-marvell-s-mochi-technology).

*Primary Examiner* — Salvador E Rivas

(57) ABSTRACT

Systems, methods, and apparatuses are disclosed herein for aggregating packets and transmitting the aggregated packets to a device in an integrated circuit. These systems, methods, and apparatuses may include receiving, at a buffer of a System-on-Chip ("SoC"), a plurality of packets for output. The SoC may determine, when each packet of the plurality of output packets is received, whether the buffer has reached a predetermined capacity. In response to determining that the buffer has reached the predetermined capacity, the SoC may identify a subset of packets of the plurality of packets that share a common characteristic, may aggregate the subset into a jumbo packet, and may transmit the jumbo packet to a destination SoC.

6 Claims, 10 Drawing Sheets

Related U.S. Application Data filed on Aug. 3, 2015, provisional application No. 62/200,444, filed on Aug. 3, 2015, provisional application No. 62/200,462, filed on Aug. 3, 2015, provisional application No. 62/200,436, filed on Aug. 3, 2015.

(51) Int. Cl.

| | | |
|---|---|---|
| *G06F 13/36* | (2006.01) | |
| *G06F 12/08* | (2016.01) | |
| *H04L 1/18* | (2006.01) | |
| *H04N 21/647* | (2011.01) | |
| *G06F 1/08* | (2006.01) | |
| *G06F 3/06* | (2006.01) | |
| *G06F 13/40* | (2006.01) | |
| *H04L 12/741* | (2013.01) | |
| *H04L 12/861* | (2013.01) | |
| *H04L 29/08* | (2006.01) | |
| *G06F 13/364* | (2006.01) | |
| *G06F 13/42* | (2006.01) | |
| *G06F 15/78* | (2006.01) | |
| *G06F 9/4401* | (2018.01) | |
| *H04N 21/24* | (2011.01) | |

(52) U.S. Cl.
CPC .......... *G06F 3/0638* (2013.01); *G06F 3/0683* (2013.01); *G06F 9/4401* (2013.01); *G06F 12/08* (2013.01); *G06F 13/36* (2013.01); *G06F 13/364* (2013.01); *G06F 13/404* (2013.01); *G06F 13/4068* (2013.01); *G06F 13/4282* (2013.01); *G06F 15/7807* (2013.01); *H04L 1/1835* (2013.01); *H04L 45/74* (2013.01); *H04L 49/90* (2013.01); *H04L 69/22* (2013.01); *H04L 69/324* (2013.01); *H04N 21/64738* (2013.01); *H04L 67/2833* (2013.01); *H04N 21/24* (2013.01)

(56) References Cited

U.S. PATENT DOCUMENTS

| | | | |
|---|---|---|---|
| 6,907,042 B1* | 6/2005 | Oguchi | H04L 47/30 |
| | | | 370/230 |
| 6,947,427 B1* | 9/2005 | Rokugo | H04L 29/06 |
| | | | 370/395.5 |
| 7,295,552 B1 | 11/2007 | Kadambi et al. | |
| 7,426,179 B1 | 9/2008 | Harshavardhana | |
| 8,072,999 B1 | 12/2011 | Cline | |
| 8,725,919 B1 | 5/2014 | Zhu et al. | |
| 2004/0179475 A1* | 9/2004 | Hwang | H04L 47/10 |
| | | | 370/229 |
| 2004/0190502 A1 | 9/2004 | Sharma | |
| 2005/0036488 A1* | 2/2005 | Kalkunte | H04L 49/351 |
| | | | 370/389 |
| 2005/0271074 A1 | 12/2005 | Johnsen | |
| 2013/0209103 A1* | 8/2013 | Melts | H04B 10/27 |
| | | | 398/58 |
| 2014/0181573 A1 | 6/2014 | Goss et al. | |
| 2015/0169495 A1 | 6/2015 | Zheng | |

\* cited by examiner

| Chip ID 302 | Device ID 304 | Number of Cross-chip Components 306 | Number of Internal Sharable Components 308 | Cross-chip Component IDs 310 | Internal Sharable Component IDs 312 | Internal Sharable Component Functionality 314 | Other Info 316 |
|---|---|---|---|---|---|---|---|
| 0 | 0 x 3456 | 2 | 5 | CCC1<br>CCC2 | 15C1<br>15C2<br>15C3<br>15C4<br>15C5 | USB<br>PCIe<br>SATA<br>USB<br>PCIe | |
| 1 | 0 x 3456 | 4 | 10 | CCCA<br>CCCB<br>•••<br>CCCJ | 15CA<br>15CB<br>•••<br>15CJ | USB<br>SATA<br>•••<br>PCIe | |

SYSTEMS AND METHODS FOR AGGREGATING DATA PACKETS IN A MOCHI SYSTEM

CROSS-REFERENCE TO RELATED APPLICATIONS

This patent application claims the benefit of U.S. Provisional Patent Application No. 62/200,436, filed Aug. 3, 2015, currently pending, and also claims the benefit of U.S. Provisional Patent Application No. 62/200,462, filed Aug. 3, 2015, currently pending, and also claims the benefit of U.S. Provisional Patent Application No. 62/200,444, filed Aug. 3, 2015, currently pending, and also claims the benefit of U.S. Provisional Patent Application No. 62/200,452, filed Aug. 3, 2015, currently pending, and also claims the benefit of U.S. Provisional Patent Application No. 62/218,296, filed Sep. 14, 2015, currently pending, the disclosures of which are each hereby incorporated by reference herein in their entireties.

BACKGROUND

The background description provided herein is for the purpose of generally presenting the context of the disclosure. Work of the inventors hereof, to the extent the work is described in the background section, as well as aspects of the description that may not otherwise qualify as prior art at the time of filing, are neither expressly or impliedly admitted as prior art against the present disclosure.

A protocol, referred to as either the hopping bus protocol or the MoChi protocol, has been developed for optimizing the efficiency of intra-chip and inter-chip communications of System-on-Chips ("SoCs"). Background of how the hopping bus protocol enables intra-chip and inter-chip communications between discrete SoCs and their components is described in commonly owned U.S. patent application Ser. No. 14/564,499 (published as U.S. Patent Application Publication No. 2015/0169495) (Referred to herein as the "Hopping Bus Reference"), the contents of which are hereby incorporated by reference herein in their entirety. Further improvements to the MoChi protocol are the subject of this disclosure.

In related protocols, the address scheme of most of the components of a system—that is, the various SoCs or chips of the system, was not configurable, and instead, was fixed at the time of manufacture of each chip. Moreover, to the extent that the address scheme was configurable, this was only for Peripheral Component Interconnect Express ("PCIe") components, and these components were only configurable after boot-up of an operating system.

Conventional integrated circuit communications protocols, such as AXI (AMBA eXtensible Interface, where AMBA stands for Advanced Microcontroller Bus Architecture), facilitate point-to-point communications between components. These protocols suffer inefficiencies because, if two components are to intercommunicate, wires that interconnect the two components must be implemented, which takes up chip space and is expensive.

SUMMARY

Systems, methods, and apparatuses are disclosed herein method for identifying a topology of a MoChi system prior to a boot-up of an operating system. To this end, in some aspects, a master SoC may detect, prior to boot-up of an operating system that uses the master SoC, an initialization command, and, in response to detecting the initialization command, the master SoC may assign a first chip identifier to the master SoC. The master SoC may then transmit a discovery communication from the master SoC to a slave SoC that is one hop away from the master SoC.

The slave SoC may determine, upon receiving the discovery communication, whether the slave SoC is a last hop SoC. In response to determining that the slave SoC is a last hop SoC, the slave SoC may transmit a reply communication to the master SoC. The reply communication may identify (1) the slave SoC, (2) a cross-chip interface component of the slave SoC, and (3) each internal sharable component of the slave SoC.

The master SoC may assign, based on the reply communication, a second chip identifier to the slave SoC.

The master SoC may identify a plurality of slave SoCs, where, upon identifying the slave SoCs, the master SoC may assign a respective chip identifier to each respective slave SoC of the plurality of slave SoCs. Subsequent to the master SoC assigning the second chip identifier to the slave SoC and the respective chip identifiers to each respective slave SoC, the master SoC may assign a cross-chip interface component identifier to the cross-chip interface component of the slave SoC. The master SoC may subsequently assign a respective internal sharable component identifier to each internal sharable component of the slave SoC. The master SoC and the slave SoC may refrain from any further inter-communicating between the master SoC and the slave SoC (i.e., beyond the discovery and reply communications) until each respective internal sharable component identifier has been assigned to each internal sharable component of the slave SoC by the master SoC.

The master SoC may generate a data structure that catalogues chip identifiers, cross-chip interface component identifiers, and sharable internal component identifiers that are assigned by the master SoC, and may store the data structure to a register located in memory of the master SoC. The data structure may catalogue functionality offered by each sharable component identified by the sharable component identifiers.

In some embodiments, the master SoC may detect a command that requires execution of a specific functionality, may access the data structure from the register, may identify a sharable internal component that has the specific functionality from the data structure, and may identify an address corresponding to the sharable internal component. The master SoC may then use this information to transmit the command to the sharable internal component based on the address.

In some embodiments, the assigning, by the master SoC, of the second chip identifier to the slave SoC does not recur unless an additional initialization command is detected at the master SoC. The register may be accessed subsequent to the assigning.

In a scenario where there are SoCs that are multiple hops away from the master SoC, the slave SoC may transmit the discovery communication to a next slave SoC, where the next slave SoC is at a next hop that is two hops away from the master SoC. The next slave SoC may determine that the next slave SoC is a last hop SoC, and, in response to determining that the next slave SoC is the last hop SoC, the next slave SoC may transmit the reply communication to the master SoC. The reply communication, when received by the master SoC, may include information pertaining to both the slave SoC and the next slave SoC.

Systems, methods, and apparatuses are also disclosed herein for aggregating packets and transmitting the aggregated packets to a device in an integrated circuit. In some aspects of the disclosure, a buffer of a System-on-Chip ("SoC") may receive a plurality of packets for output. The SoC may determine, when each packet of the plurality of output packets is received, whether the buffer has reached a predetermined capacity. In response to determining that the buffer has reached the predetermined capacity, the SoC may identify a subset of packets of the plurality of packets that share a common characteristic, aggregate the subset into a jumbo packet, and transmit the jumbo packet to a destination SoC.

In some embodiments, the SoC may further, in response to determining that the buffer has not reached the predetermined capacity, transmit each packet of the plurality of packets on-the-fly as each packet is received. Transmitting each packet of the plurality of packets on-the-fly as each packet is received may include first generating, at the SoC, a respective header comprising an address for each packet of the plurality of packets, and then determining whether the combined size of the respective header plus the size of a payload of a given packet exceeds a maximum packet size. In response to the SoC determining that the combined size does not exceed the maximum packet size, the SoC may transmit the header and the payload together in a single line. In response to the SoC determining that the combined size does exceed the maximum packet size, the SoC may generate a second header, transmit the first header and a portion of the payload together in a first line, and transmit the second header and a remainder of the payload together in a second line.

The buffer of the SoC may include a plurality of sub-buffers that each correspond to a different characteristic. In such cases, the SoC, when determining whether the buffer has reached a predetermined capacity, may determine whether a sub-buffer of the plurality of sub-buffers has reached the predetermined capacity. The subset may include packets of the sub-buffer, and aggregating the subset into a jumbo packet may include performing the aggregating in parallel with transmitting packets of a different sub-buffer.

In some embodiments, the common characteristic may be an address of a destination component. In these cases, aggregating the subset into the jumbo packet may include generating a header for the jumbo packet that indicates the address of the destination component. In other embodiments, the common characteristic may be a characteristic other than an address of a destination component. In these cases, when identifying the subset, the SoC may first determine a respective destination address of each packet of the plurality of packets that share the common characteristic, and may then identify a most common destination address of the respective destination addresses. Finally, the SoC may limit the subset to packets that share the most common destination address.

The SoC, when aggregating the subset into the jumbo packet, may aggregate respective payloads of each packet of the subset into a combined payload, may generate a header, and may combine the combined payload with the header to form the jumbo packet. Further, the SoC, when generating the header, may generate the header with a destination address field, a flow control field, and a cyclic redundancy check field, and wherein transmitting the jumbo packet to the destination SoC comprises transmitting the jumbo packet to an SoC that corresponds to a destination address indicated in the destination address field.

The jumbo packet may be any size of a plurality of sizes. Further, the SoC may determine a size of the plurality of sizes that the jumbo packet will comprise based on a fullness of the buffer.

Systems, methods, and apparatuses are also described herein for discovering unknown chips and chip components of a MoChi system. To this end, in some aspects of the disclosure, a first SoC may transmit a first discovery packet from a downlink MoChi port of a first System-on-Chip ("SoC") to an uplink MoChi port of a second SoC. The first SoC may receive, at the downlink MoChi port of the first SoC, from the uplink MoChi port of the second SoC, a first reply packet. The first SoC may then determine whether the reply packet indicates that the second SoC is a known SoC or an unknown SoC. In response to determining that the second SoC is an unknown SoC, the first SoC may assign a first address mask to the first SoC that identifies that the second SoC can be reached by way of the first SoC.

The first SoC, in response to determining that the reply packet indicates that the second SoC is a known SoC, may cause the second SoC to transmit a discovery packet from a downlink MoChi port of the second SoC to an uplink MoChi port of a third SoC. The first SoC may then receive, at the downlink MoChi port of the first SoC, a second reply packet from the third SoC. The first SoC may determine that the third SoC is an unknown SoC, and, in response to determining that the third SoC is an unknown SoC, the first SoC may assign a second address mask to the second SoC that identifies that the third SoC can be reached by way of the second SoC.

The first SoC may be a master SoC, and the assigning of the second address mask may include associating, by the master SoC, the assigned address mask with a chip identifier of the second SoC, in an address register that is stored at the master SoC. Moreover, the assigning of the first address mask and of the second address mask may include establishing a hierarchy of masks, where the second address mask comprises indicia that the uplink Mochi port of the second SoC is to be accessed by way of the downlink MoChi port of the first SoC.

In some embodiments, the downlink MoChi port of the first SoC may include an enter value, and the enter value may indicate a global address of the downlink MoChi port that, if included in an address field of a downstream packet that is traveling upstream, indicates to downstream MoChi ports that the packet is to travel all the way upstream to the downlink MoChi port of the first SoC. The downlink MoChi port of the first SoC may further include an exit value, where the exit value may indicate a range of addresses that, if detected in an outbound packet, should be transmitted through the downlink MoChi port of the first SoC, as opposed to being transmitted through a different downlink MoChi port of the first SoC.

Each uplink MoChi port and downlink MoChi port of the MoChi system may include a respective enter value and a respective exit value, and each respective enter value may indicate a range of hops of SoCs from which a downstream SoC is away from a master SoC. Moreover, each uplink MoChi port and downlink MoChi port of the MoChi system further comprise a respective common value, where the respective common value may be a global address stored in memory of main random access memory ("RAM") that can be used to reach the respective MoChi port.

Additionally, each uplink MoChi port of the MoChi system may include an offset value that indicates, by way of a hierarchical scheme, a number of components included on a respective SoC on which a respective uplink MoChi port is embedded. The uplink MoChi port of the second SoC may include an exit value, and the exit value may include a prefix that indicates all MoChi chip spaces that are downstream of the uplink MoChi port.

BRIEF DESCRIPTION OF THE DRAWINGS

FIG. 3 depicts an illustrative example of a data structure that associates various chips and their components with auxiliary information, in accordance with some embodiments of the disclosure;

DETAILED DESCRIPTION

In some aspects of the disclosure, systems and methods are provided herein for a process of identifying each chip, and each component of a chip, in a system, based on the topology of the system. As used herein, the terms "SoC" and "Chip" are used interchangeably. Moreover, the term MoChi, as used herein, refers to a system or component that utilizes the mechanisms described in this disclosure.

Figure 1:
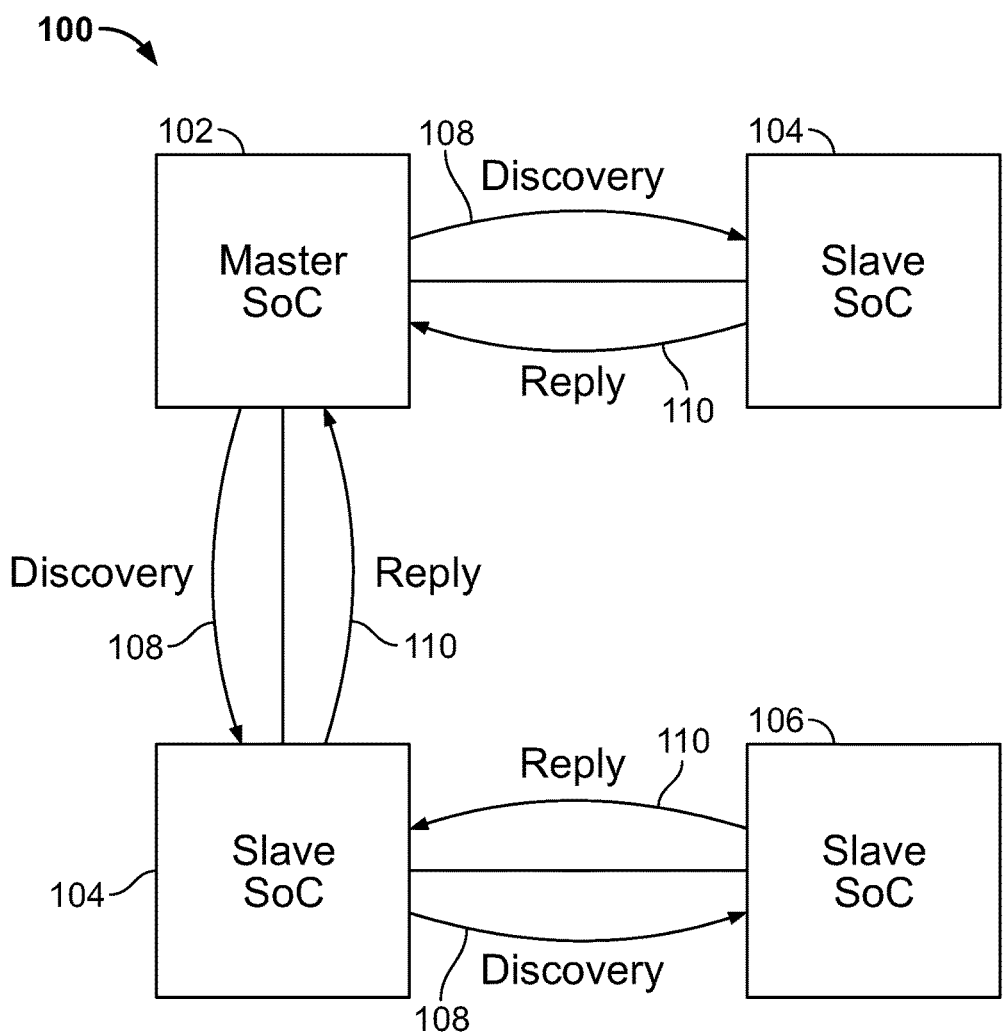
FIG. 1 depicts an illustrative topology of a MoChi system, and depicts a topology-based identification process, in accordance with some embodiments of the disclosure.

FIG. 1 depicts a topology of a MoChi system, and depicts a topology-based identification process, in accordance with some embodiments of the disclosure. MoChi system 100, as depicted, includes a master SoC 102, and slave SoCs 104 and 106. Slave SoCs 104 are one hop away from master SoC 102, and slave SoC 106 is two hops away from master SoC 102. Master SoC 102 is designated as "master" because master SoC 102 initiates and guides the identification of, and assignment of addresses for, each chip and each chip component of MoChi System 100. Slave SoCs 104 and Slave SoC 106 are designated as "slave" because, for the purpose of the identification process, they receive commands from master SoC 102 and reply to the commands from master SoC 102.

When a system is reset, and thus, when an initialization command is received, master SoC 102 may begin an identification process in order to identify each chip of MoChi system 100. First, master SoC 102 may assign itself a global identifier, such as a Chip identifier ("ID"). The term "global identifier," as used herein, refers to an identifier that can be used by any chip of MoChi system 100 to identify any other chip of MoChi system 100, and can be used to address communications intended to be received by the other chip of MoChi system 100. Master SoC 102 may then transmit discovery communication 108 to slave SoCs 104, which are one hop away from master SoC 102. Each slave SoC 104 may then determine whether it is a last hop SoC—that is, whether it sits between master SoC 102 and another chip on a communications path, or not. If a slave SoC 104 is a last hop SoC, then the slave SoC 104 may generate and transmit a reply communication 110 back to the master SoC that identifies itself. Reply communication 110 may also convey additional information, such as information about cross-chip interfaces and internal sharable components within SoC 104. This additional information will be discussed further with respect to FIGS. 2 and 3 below.

If slave SoC 104 is not a last hop SoC, then slave SoC 104 may transmit discovery communication 108 to a next hop slave SoC, and this process may continue until a last hop SoC is encountered. During this process, each non-last slave SoC 104 may add information that identifies itself, as well as the above-mentioned information, to discovery communication 108. Alternatively, each non-last hop slave SoC 104 may refrain from adding this information, and may simply forward discovery communication 108 to the last hop slave SoC 106. Last hop slave SoC 106 may then generate and transmit reply communication 110 back to master SoC 102. In addition to the information described above, reply communication 110 may include information pertaining to the non-last hop SoCs 104 that was added when discovery communication 108 was en route to slave SoC 106. Alternatively, reply communication 110 may, as it passes through each slave SoC 104 between master SoC 102 and last hop slave SoC 106, have information pertaining to each respective slave SoC 104 added to it as it passes through each respective slave SoC 104.

When master SoC 102 receives reply communication 110, master SoC 102 may assign local identifiers ("IDs") to each cross-chip component of a given slave SoC identified by reply communication 110. As used herein, the term "cross-chip component" describes an interface that translates between the protocol used by MoChi System 100 (sometimes referred to herein as the MoChi protocol), and a local protocol used by the given slave SoC. This functionality is further described in the Hopping Bus Reference mentioned above. The term "local ID," as used herein, is used to describe an identifier for a component that is local to a given chip. After all cross-chip components are assigned respective local IDs, master SoC 102 may assign local IDs to the other internal sharable components of the given slave SoC.

In a preferred embodiment, the topology based identification process described above should only be run once after a reset of MoChi system 100. Register access of the addresses assigned by master SoC 102, however, can be performed any time. In this preferred embodiment, intercommunication between chips and/or components will not begin or be allowed until such a time that all chips and components of MoChi system 100 are identified by master SoC 102, and thus, the topology of MoChi system 100 is fixed. Moreover, while FIG. 1 depicts a fixed master SoC 102, any chip of MoChi system 100 that has a central processing unit ("CPU") may designate itself as the master SoC, thus causing the other chips of MoChi system 100 to be slave SoCs. This designation may be pre-programmed, may be randomly assigned upon receipt of an initialization command, or may occur for any other reason.

Figure 2:
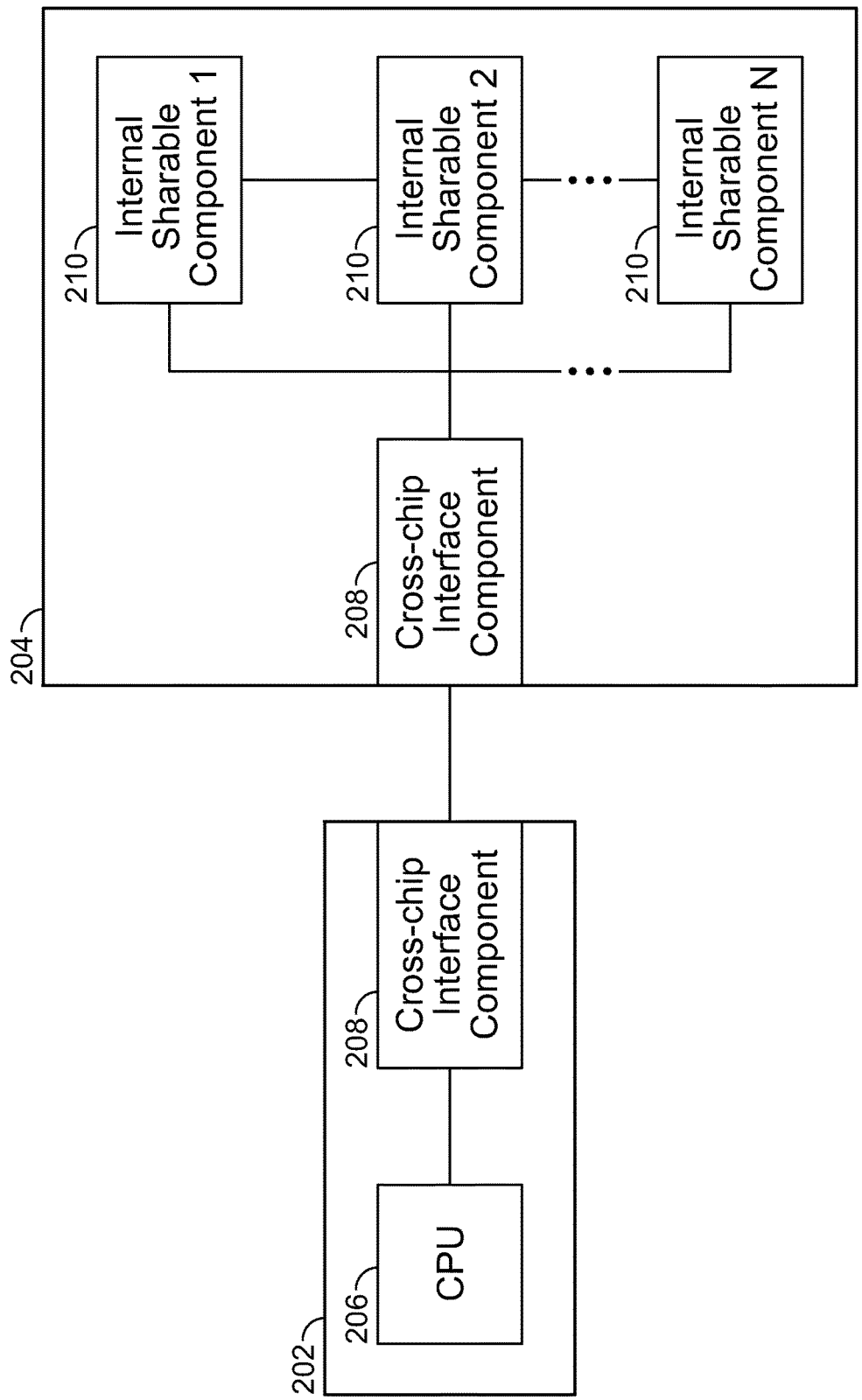
FIG. 2 depicts an illustrative example of internal components of an SoC in a MoChi system, in accordance with some embodiments of the disclosure.

FIG. 2 depicts internal components of an SoC in a MoChi system, in accordance with some embodiments of the disclosure. As depicted in FIG. 2, MoChi system 200 contains two chips—master SoC 202, and slave SoC 204. Master SoC 202 contains CPU 206 and cross-chip interface component 208. CPU 206 may affect any of the topology based identification processes described in the foregoing or below. Cross-chip interface component 208 of master SoC 202 may, as described above, translate communications from CPU 206 into a protocol understood by MoChi system 200. Similarly, cross-chip interface component 208 of slave SoC 204 may translate communications received from master SoC 202 into a protocol understood by components of slave SoC 204. Slave SoC 204 includes internal sharable components 210. Various functionality and communications capabilities of internal sharable components 210 are described in at least paragraph 25 of the Hopping Bus Reference, and this functionality is within the scope of this disclosure.

FIG. 3 depicts a data structure that associates various chips and their components with auxiliary information, in accordance with some embodiments of the disclosure. Table 300 represents a data structure that tracks the information assigned by master SoC 102 to slave SoCs 104 and 106, and tracks other auxiliary information. In table 300, Chip IDs reflect an identifier assigned by the master SoC to each chip of MoChi System 100. Chip ID 0 is assigned to master SoC 102 itself, and consecutive numbered chip IDs are assigned to each discovered slave SoC 104 and 106. Device IDs 304 may be device identifiers assigned by a manufacturer to a device, and all chips embedded on a single device will reflect the same device ID 304. Because the MoChi protocol allows for chips of different devices to intercommunicate, device ID 304 will not necessarily be uniform in a fully configured system. Columns 306 and 308 track the number of cross-chip components and internal sharable components, respectively, that are within a given chip. Columns 310 and 312, respectively track the local IDs assigned by master SoC 102 to each cross-chip component and internal sharable component of a given chip. If reply communication 110 reflects functionality of any given internal sharable component, column 314 may reflect the functionality. The functionality may be updated after initialization based on any other intercommunication between chips. Column 316 may include any other information relating to the chips or components of MoChi System 100.

Figure 4:
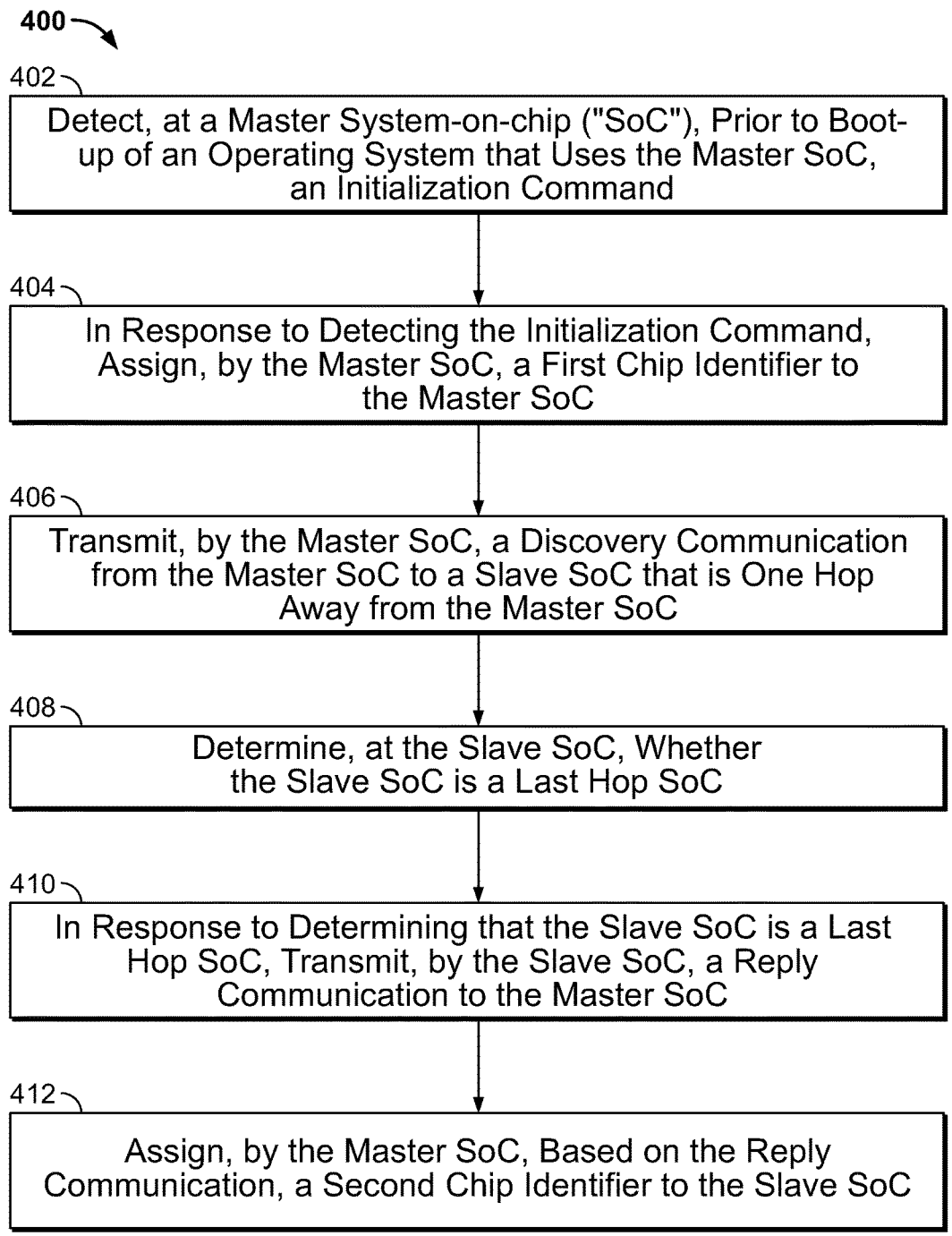
FIG. 4 is an illustrative flow chart that depicts a process for initializing a MoChi system, in accordance with some embodiments of the disclosure.

FIG. 4 is an illustrative flow chart that depicts a process for initializing a MoChi system, in accordance with some embodiments of the disclosure. Process 400 begins at 402, where a master SoC (e.g., master SoC 102), may detect, prior to boot-up of an operating system that uses the master SoC, an initialization command. Process 400 may continue to 404, where, in response to detecting the initialization command, master SoC 102 may assign a first chip identifier to the master SoC (e.g., a "0" assignment as depicted in 302).

Process 400 may continue to 406, where the master SoC may transmit a discovery communication (e.g., discovery communication 108 from the master SoC to a slave SoC that is one hop away from the master SoC (e.g., slave SoC 104 or slave SoC 106). Process 400 may then continue to 408, where the slave SoC may determine whether it is a last hop SoC. At 410, the slave SoC may, in response to determining that the slave SoC is a last hop SoC, transmit, by the slave SoC, a reply communication (e.g., reply communication 110) to the master SoC. At 412, the master SoC may assign, based on the reply communication, a second chip identifier to the slave SoC (e.g., Chip ID "1" as indicated in 302).

Following the initialization processes described with above with respect to FIGS. 1-4, data packets can be sent across a MoChi system (e.g., MoChi system 100). As an example, MoChi cross-chip interface components (e.g., cross-chip interface component 208) can use serialized high speed data paths, with communications traveling on any of the application layer, the transport layer, the data link layer, and the physical layer. The MoChi architecture described in the foregoing optimizes communications across all OSI (Open Systems Interconnection) layers and assures an optimal latency. The communications may take place over varying modes, such as a line mode and an aggregated mode, both of which will be described in further detail below.

Figure 5:
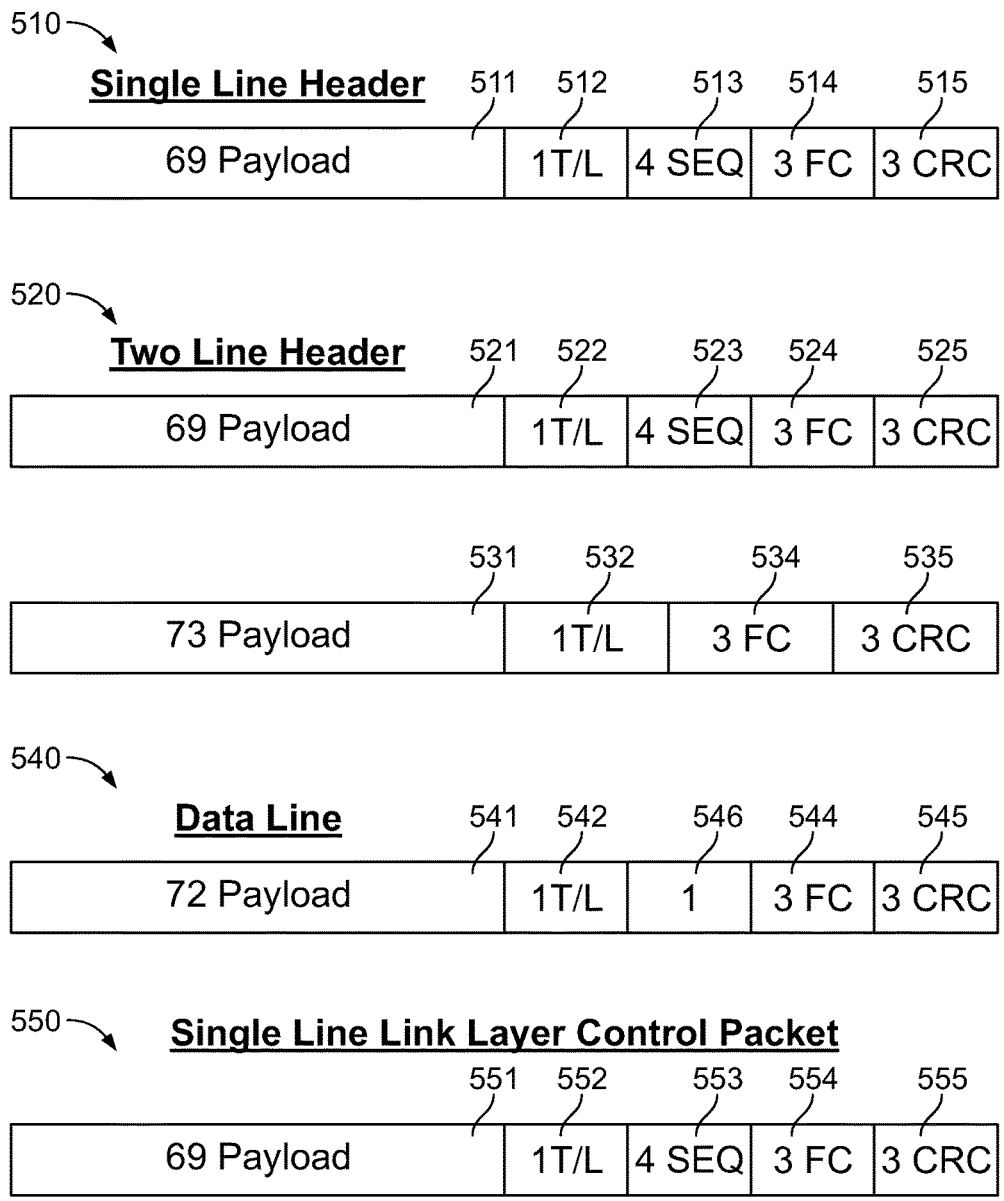
FIG. 5 depicts several illustrative examples of data packets that may be processed by a chip of a MoChi system, in accordance with some embodiments of the disclosure.

FIG. 5 depicts several illustrative examples of data packets that may be processed by a chip of a MoChi system, in accordance with some embodiments of the disclosure. Each packet 510, 520, 540, and 550 is transmitted in line mode. In line mode, each data transaction (e.g., AXI transaction) is packetized on-the-fly (e.g., in real time, as commands are received). An exemplary packet (e.g., packets 510, 520, 540, and 550) is transmitted with 80 bits in each line, though packets may be transmitted with more bits or less bits than 80 bits.

Packet 510 is a packet with a single line header. Single line headers, for example, may be used when transmitting read data or acknowledgments. Payload 511, as illustrated, has 69 bits. Payload 511 may include any relevant data, including command data, address data, and the like. Transfer layer/link layer ("T/L") component 512 may include control information, and may comprise 1 bit of information. Sequence number 513 describes a sequence number of packet 510, and may be used to ensure packets are transmitted or received in order. Flow control component 514 may comprise 3 bits of information, and may be used to determine a flow control parameter of packet 510. Error check component 515 may be a cyclic redundancy check (CRC) field, and may comprise 3 bits. In sum, packet 510 has 80 bits of information.

In some cases, such as when transmitting read address or write address and data packets, not all header information is able to fit in one line, typically an 80 bit line. Thus, headers may be distributed over two or more data lines. Packet 520 comprises a two-line header where a 142 bit payload is distributed across two lines that are to be separately transmitted. Payloads 521 and 531 have similar functionality to payload 511. Transfer layer/link layer components 522 and 532 have similar functionality to transfer layer/link layer component 512. Sequence number 523 dictates the sequence numbers for both lines of packet 520—there is no need to include a sequence number in both lines, which saves space in the second line. Flow control components 524 and 534 have similar functionality to flow control component 514. Error check components 525 and 535 have similar functionality to error check component 515. Each line of packet 520 has the same number of bits—namely, 80 bits, as illustrated.

Packet 540 illustrates a data line that may be transmitted with any header of the MoChi system, such the headers illustrated in packet 510 and packet 520. Payload 541, Transfer layer/link layer component 542, flow control component 544, and error check component 545 have similar functionality to their counterpart components described with respect to packet 510. Padding bit 546 is used to ensure that packet 540 has the same number of packets as the other packets used in the system for consistent processing (namely, 80 packets, in the illustration of FIG. 5). While packet 540 is illustrated as only being one line long, a packet may have multiple data lines, and thus a single packet may use a multi-line header or single-line header (e.g., packets 520 and 510 respectively) in addition to multiple data lines 540.

Packet 550 illustrates a single line link layer control packet that may be used for register access, system discovery, and other control functions. Payload 551, transfer layer/link layer component 552, sequence component 553, flow control component 554, and error check component 555 have similar functionality to their counterpart components described with respect to packet 510.

In some embodiments, block mode (interchangeably used with "aggregation mode" in this disclosure) may be employed to transmit packets. Line mode is generally used when the transmission buffer of a MoChi chip or component is very low, and so there is no bandwidth issue or bottleneck. However, where there is a bottleneck or bandwidth issue (e.g., in a cross-chip interface component, such as cross-chip interface component 208), it may be advantageous to aggregate packets by using block mode to alleviate the bottleneck. In a block mode, a single header may used to transmit a large number of aggregated packets, thus reducing required bandwidth, as compared to bandwidth needed to transmit packets in line mode, each with a separate header. Moreover, smaller packets may be aggregated to ensure that most of, or an entire width, of a packet is used in a single data transmission.

Figure 6:
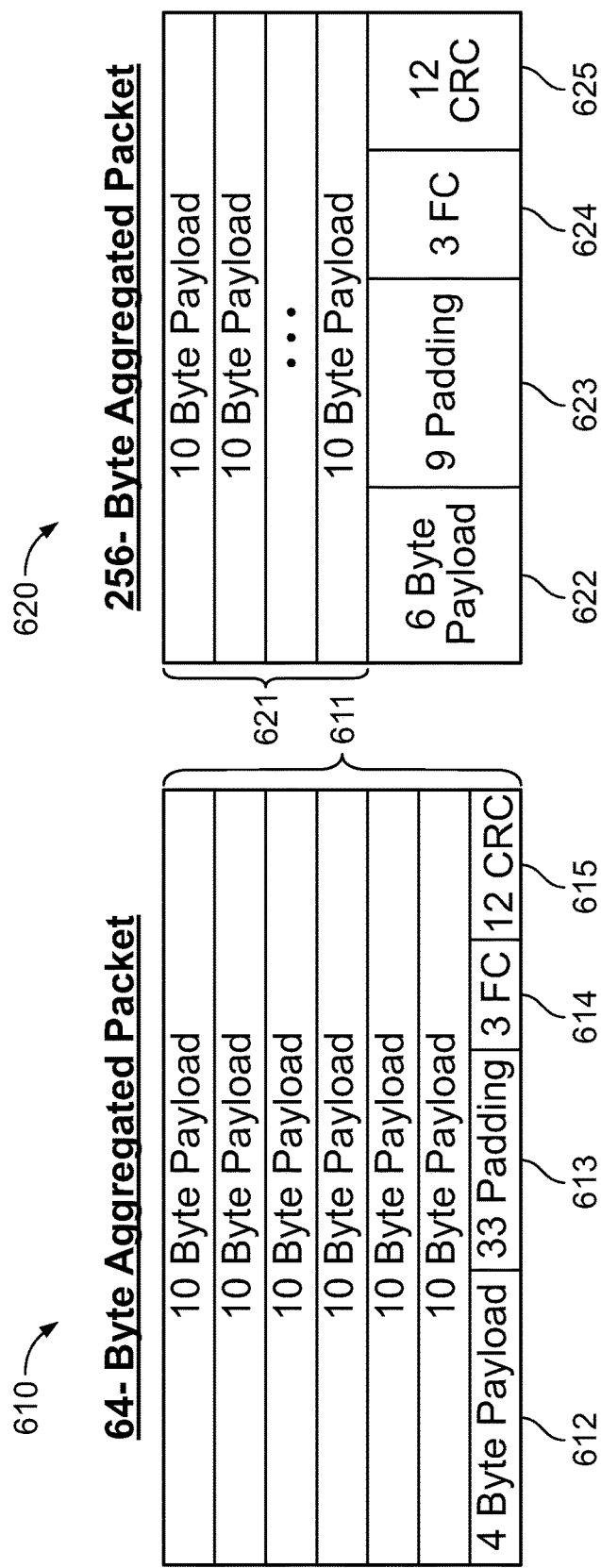
FIG. 6 depicts several illustrative examples of aggregated packets that may be processed by a chip of a MoChi system, in accordance with some embodiments of the disclosure.

FIG. 6 depicts several illustrative examples of aggregated packets that may be processed by a chip of a MoChi system, in accordance with some embodiments of the disclosure. FIG. 6 depicts 64-byte aggregated packet 610, and 256 byte aggregated packet 620, each aggregated in block mode. It is estimated that transmission efficiency improves by about ten percent when 64-byte aggregated packet 610 is used for data transfers, and by about twenty percent when 256 byte aggregated packet 620 is used for data transfers.

64-byte aggregated packet 610 comprises six 10-byte payloads 611, as well as a header comprising a four byte payload 612, a thirty-three bit padding bit component 613, a three-bit flow control component 614, and a twelve bit error check component 615. Each of header payload 612, padding bit component 613, flow control component 614, and error check component 615 have similar functionality to that described with respect to their respective counterpart components described above with reference to FIG. 5. Each of the ten-byte payloads 611 may have similar functionality to data line 540 or payload 541, and may each relate to separate data transmissions that pertain to a similar communication, as will be described further with respect to FIG. 7.

256-Byte aggregated packet 620 comprises thirty-one 10-byte payloads 621, as well as a header comprising a six-byte payload 622, a nine-bit padding bit component 623, a three-bit flow control component 624, and a twelve-bit error check component 625. Each of header payload 622, padding bit component 623, flow control component 624, and error check component 625 have similar functionality to that described with respect to their respective counterpart components described above with reference to FIG. 5. Each of the ten-byte payloads 621 may have similar functionality to data line 540, and may each relate to separate data transmissions that pertain to a similar communication, as will be described further with respect to FIG. 7.

Figure 7:
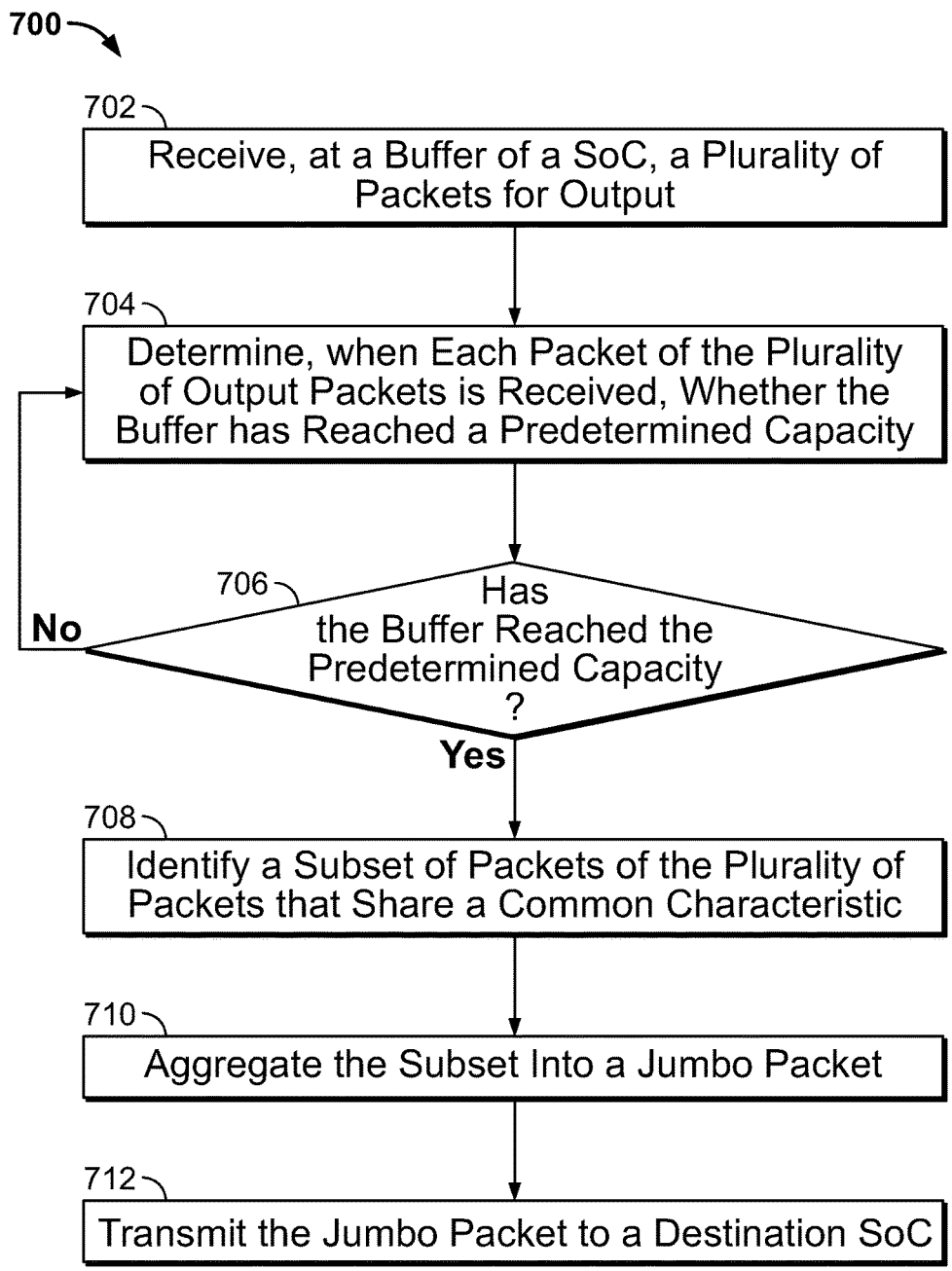
FIG. 7 is an illustrative flow chart that depicts a process for generating an aggregated packet, in accordance with some embodiments of the disclosure.

FIG. 7 is an illustrative flow chart that depicts a process for generating an aggregated packet, in accordance with some embodiments of the disclosure. Process 700 begins at 702, where a buffer within an SoC (e.g., within cross-chip interface component 208 of master SoC 202) receives a plurality of packets for output. At 704, control circuitry (e.g., of master SoC 202) determines, when each packet of the plurality of output packets is received, whether the buffer has reached a predetermined capacity.

At 706, control circuitry of the SoC makes the determination as to whether the buffer has reached a predetermined capacity, and, if the buffer has not reached the predetermined capacity, process 700 loops back to 704 to continue monitoring whether the predetermined capacity is reached as next packets are received. If a buffer or sub-buffer has reached a predetermined capacity, however, process 700 continues to 708.

At 708, control circuitry of the SoC may identify a subset of packets of the plurality of packets that share a common characteristic. For example, the subset may comprise packets with a same command, or packets addressed to a same component of MoChi system 100. At 710, the control circuitry of the SoC may aggregate the subset into a jumbo packet (e.g., 64-byte aggregated packet 610 or 256-btye aggregated packet 620. At 712, the control circuitry of the SoC may cause the jumbo packet to be transmitted to a destination SoC (e.g., slave SoC 204, which may route the jumbo packet to a given packet, or may deconstruct the packet for transmission to different components of slave SoC 204).

In some embodiments (e.g., during initialization, or when a new component is added to a MoChi system), an SoC may be unknown to a master SoC of a MoChi system. To this end, control circuitry (e.g., of a master SoC) may establish a hierarchical, or cone, topology (e.g., during initialization) in order to effectively identify the unknown SoC. This is discussed below with reference to FIGS. 8-10.

Figure 8:
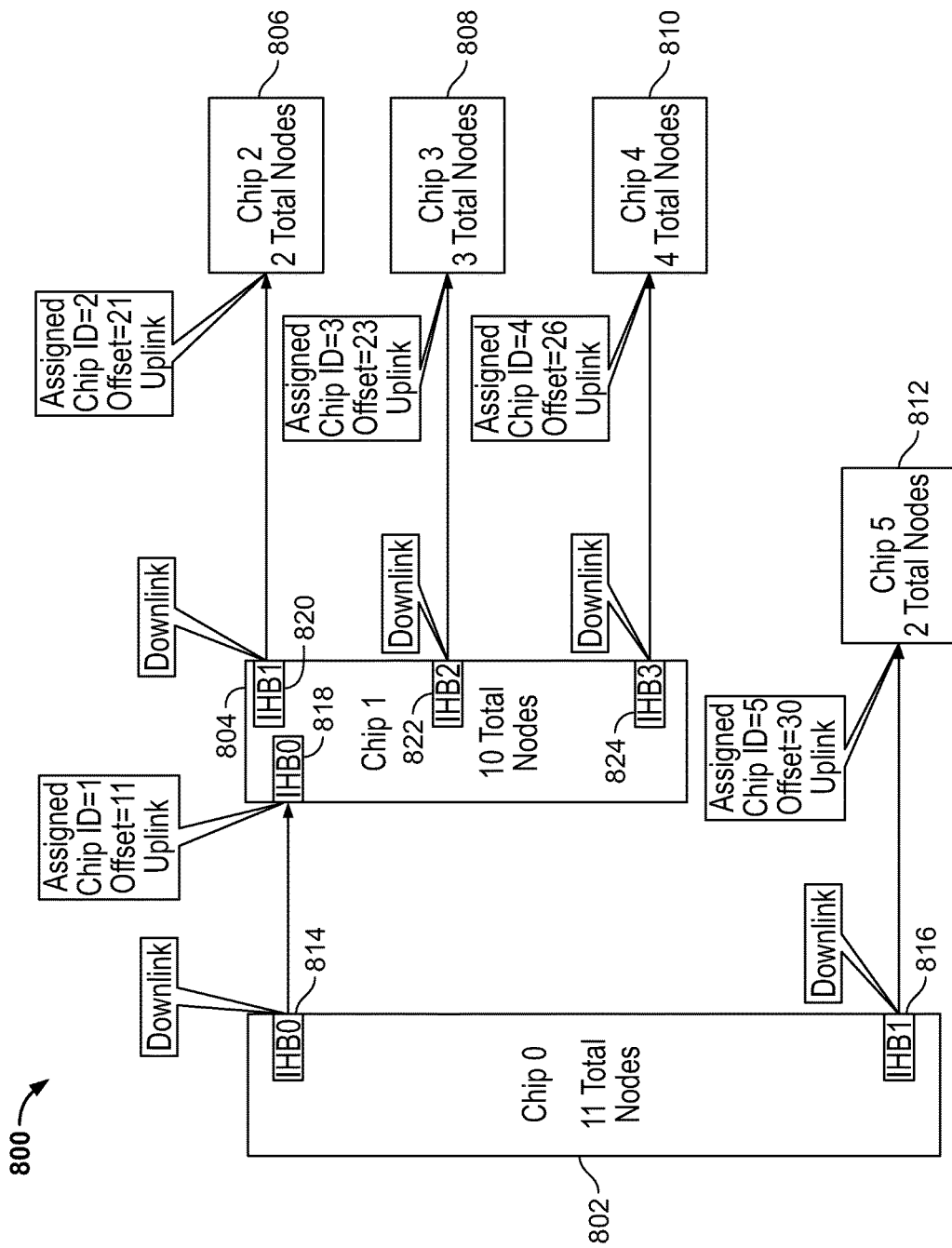
FIG. 8 depicts an illustrative topology of SoCs in a MoChi system, including some details of uplink ports of the SoCs, in accordance with some embodiments of the disclosure.

FIG. 8 depicts an illustrative topology of SoCs in a MoChi system, including some details of uplink ports of the SoCs, in accordance with some embodiments of the disclosure. Chip 802 is a master SoC, which has assigned itself a chip ID of "0" in accordance with the assignments described above with respect to FIG. 3. As illustrated in FIG. 1, chip 802 has eleven internal nodes, or components (e.g., cross-chip and sharable components). The term "node" and "component" is used interchangeably in this disclosure.

Chip 802 includes two downlink MoChi ports 814 and 816. Downlink MoChi ports 814 and 816 extend connectivity of MoChi system 800 to additional chips in MoChi system 800 (e.g., chips 804, 806, 808, 810, and 812). An uplink MoChi port is a port that received initialization commands from upper level chips. Chip 802 does not have uplink MoChi ports because chip 802 is a master SoC and thus has no need to transmit information upstream. To the extent that additional MoChi ports exist on chip 802, these chips are not connected, and are thus referred to as inactive ports.

Chip 804 includes uplink MoChi port 818 for transmitting information upstream to chip 802, and also includes downlink MoChi ports 820, 822, and 824 for transmitting information downstream to chips 806, 808, and 810. Consistent with the description above with respect to FIG. 3, chip 804 has been assigned a chip ID of "1," and includes ten total nodes. The term "offset" as used herein describes the number of components that are assigned addresses ahead of a given chip. Thus, chip 804 has an offset of 11—meaning, the components of chip 804 are offset by the total number of upstream nodes (i.e., the 11 total nodes of chip 802).

Chips 806, 808, 810, and 812 each have 2, 3, 4, and 2 nodes, respectively. While not depicted, they also each have uplink ports. Their offsets and chip IDs are described in FIG.

8. As one can see, MoChi system 800 uses a "cone" architecture, where a hierarchy is established such that a master SoC (e.g., chip 802) does not directly interface with most chips (e.g., chips 806, 808, and 810), but rather passes communications through an intermediary chip (e.g., 804). The term "cone" is used because a MoChi system ends at one point—namely, at the master SoC, and broadens out as one goes down the cone, with an increasing number of chips in any given layer of the cone as one goes further downstream from the master SoC. Note that chips that are in the middle of a MoChi cone generally only have one uplink MoChi port, but may have many downlink MoChi ports (e.g., downlink MoChi ports 820, 822, and 824 of chip 804).

Figure 9:
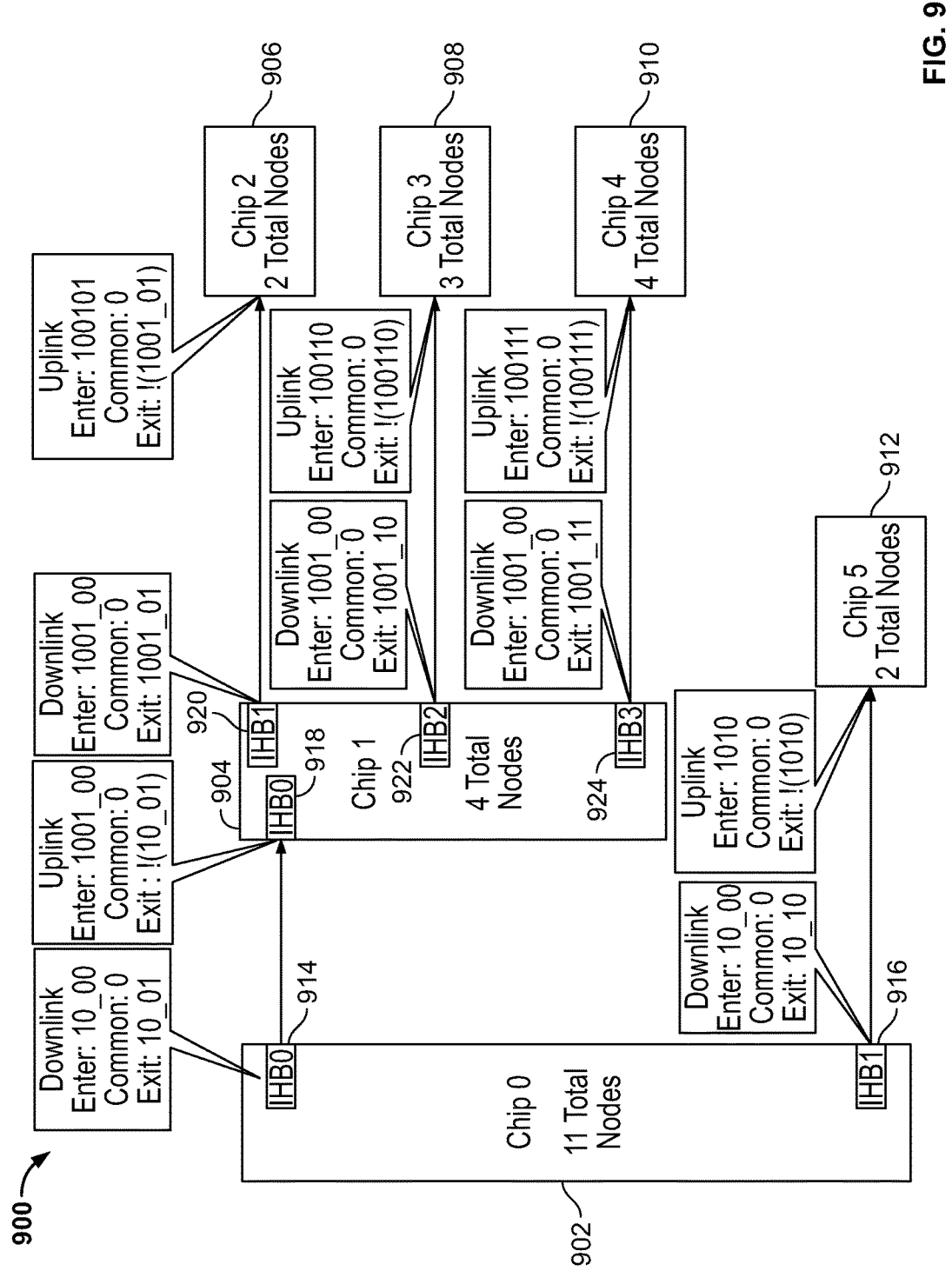
FIG. 9 depicts an illustrative topology of SoCs in a MoChi system, including some details of uplink ports and downlink ports of the SoCs, in accordance with some embodiments of the disclosure.

FIG. 9 depicts an illustrative topology of SoCs in a MoChi system, including some details of uplink ports and downlink ports of the SoCs, in accordance with some embodiments of the disclosure. MoChi system 900 includes chips 902, 904, 906, 908, 910, and 912, each of which correspond to their respective counterparts of FIG. 8's MoChi system 800. Chip 902, which is a master SoC, comprises an enter address comprising an enter prefix of "10" and an enter mask of "00." An enter prefix and mask, together, comprise a global address assignment for a chip. If a packet has an address that is consonant with a given MoChi port's prefix and enter mask, the packet will be directed to a chip corresponding to the given MoChi port.

The enter prefix defines a range in relation to the master SoC. Thus, the enter prefix of downlink MoChi ports 914 and 916 of chip 902 have a same prefix of "10," because they are at the same range from the master SoC, whereas the enter prefix of ports 918, 920, 922, and 924 of chip 904 is "1001," which defines a next level of range. For each level of range, an additional two bits are added to the enter prefix. Thus, the enter prefix of the uplink MoChi ports of chips 906, 908, and 910 are of the range 1001xx, where the xx bits vary depending on which uplink MoChi port each chip is connected to.

The enter mask is two bits, and varies by chip. For example, a mask of "00" corresponds to a downlink MoChi port of an upstream chip, and a mask of 01 or 10 may correspond to an uplink MoChi port of a downstream chip (where the mask varies depending on which downstream chip a packet is intended to travel to).

Exit prefixes and exit masks function identically to the enter masks and enter prefixes—packets exiting a given MoChi port will travel to an address that corresponds to the range (i.e., prefix) and specific chip (i.e., mask) indicated by the exit address that the exit prefixes and exit masks form. As an example, a packet with an address of 100111 (i.e., having an exit prefix of 1001 and a mask of 11) will travel from port 914 (with an exit of address of 1001) of chip 902 to port 918 of chip 904 (with an enter prefix of 1001), and will then be routed through port 924, which has an exit address of 100111, to the uplink port of 910, which has an enter address of 100111.

Thus, a packet is able to easily be navigated through a MoChi cone by following the hierarchy of enter/exit prefixes and enter/exit masks, whether traveling upstream or downstream. Note that a packet traveling upstream from a downstream chip (e.g., chip 910) need only be addressed to any port other than the upstream port's own address to be transmitted upstream to the next intermediate node for further processing, as indicated by the function!(100111).

Each MoChi port of MoChi system 900 has three sets of address prefixes and mask registers. The first set is the enter prefixes and masks, which, as described above, together form a global address assignment for a chip. The next is the exit prefixes and masks, which, together, define the address range that should exit a given MoChi port. The decoding for the exit address depends on whether it is traveling through an uplink or downlink MoChi port. For a downlink MoChi port, if the address of the downlink MoChi port matches a prefix and mask, the packet will exit that port. For an uplink port, based on the MoChi cone concept described above, if an address does not match an address belonging to the port, the unmatched address shall simply exit the port upward through the cone until it finds a chip who has a port with a matching address.

The final set of address prefixes and address registers is the common prefix and mask. Together, these form a global address for main memory (e.g., a main double data rate random access memory ("DDR")). Any packet that has an address with a common prefix and mask will simply be sent to a port or chip corresponding to an address listed in a common DDR global register.

Figure 10:
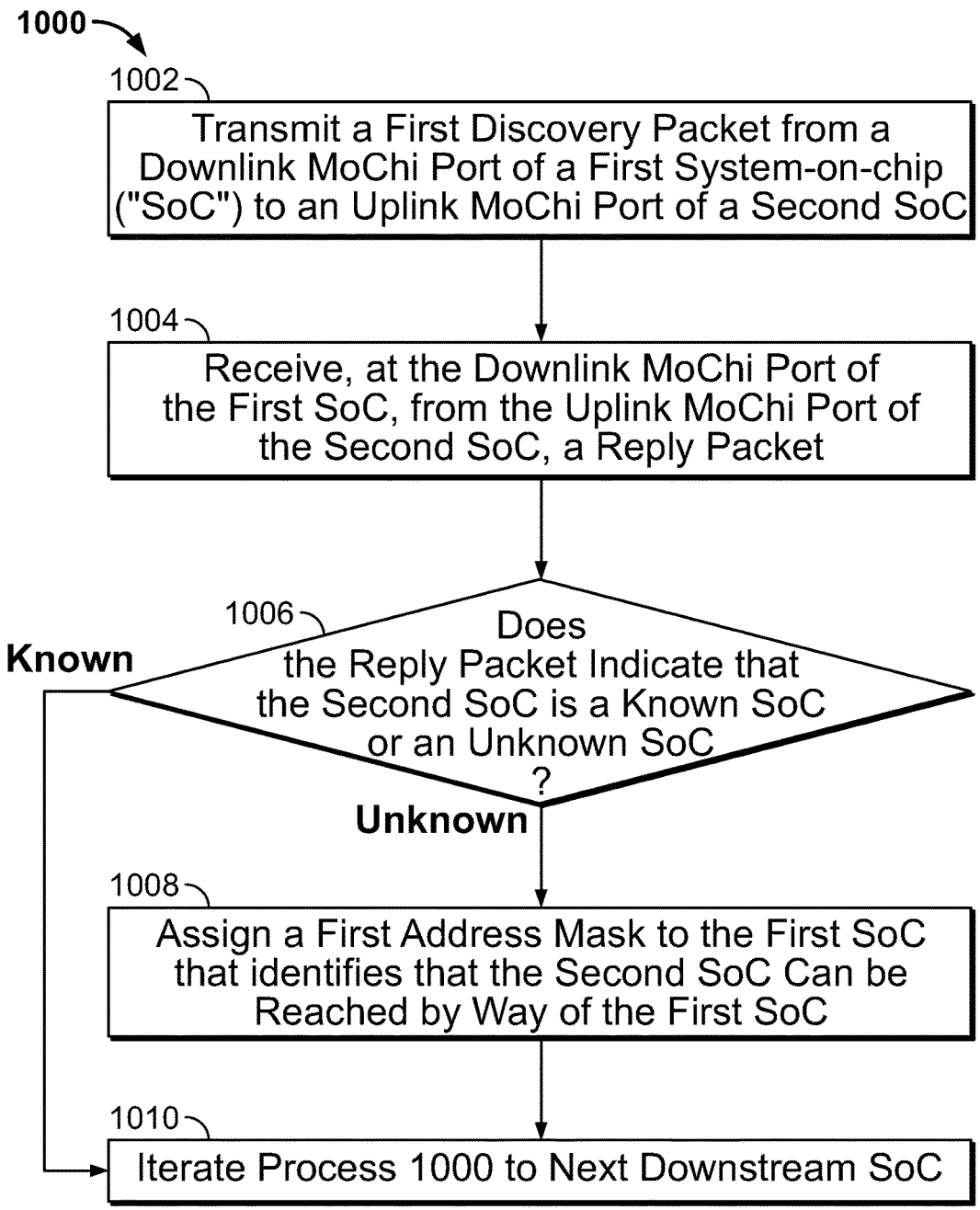
FIG. 10 depicts an illustrative flow chart that depicts a process for discovering an unknown SoC, in accordance with some embodiments of the disclosure.

FIG. 10 depicts an illustrative flow chart that depicts a process for discovering an unknown SoC, in accordance with some embodiments of the disclosure. Process 1000 begins at 1002, where control circuitry (e.g., of a master SoC, such as chip 902) may transmit a first discovery packet from a downlink MoChi port (e.g., downlink MoChi port 914) to an uplink MoChi port (e.g., uplink MoChi port 918) of a second SoC (e.g., chip 904). For example, the discovery packet (e.g., control packet 550) may have been transmitted based on an exit address of downlink MoChi port 914 and an enter address of uplink MoChi port 918, as described with respect to FIG. 9 above.

Process 1000 may continue to 1004, where the first SoC (e.g., chip 902) may receive, at the downlink MoChi port of the first SoC (e.g., downlink MoChi port 914), from the uplink MoChi port of the second SoC (e.g., uplink MoChi port 918 of chip 904), a first reply packet (e.g., control packet 550). At 1006, the control circuitry (e.g., of chip 902) may determine whether the reply packet indicates that the second SoC (e.g., chip 904) is a known SoC or an unknown SoC. If the SoC is unknown, process 1000 may proceed to 1008, where the control circuitry may assign a first address mask to the first SoC that identifies that the second SoC can be reached by way of the first SoC (e.g., assign exit mask 01 for accessing chip 904, or assign exit mask 10 for accessing chip 912). If, the SoC is known, process 1000 may proceed to 1010, where the control circuitry may iterate process 1000 to the next downstream SoC to determine whether to assign exit masks to, e.g., downstream MoChi ports 920, 922, and/or 924.

The foregoing describes systems, methods, and apparatuses for configuring and implementing MoChi systems. The above-described embodiments of the present disclosure are presented for the purposes of illustration and not of limitation. Furthermore, the present disclosure is not limited to a particular implementation. For example, one or more steps of the methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software by, for example, encoding transitory or non-transitory instructions for performing the process discussed above in one or more transitory or non-transitory computer-readable media.

What is claimed is:

1. A method for aggregating packets and transmitting the aggregated packets to a device in an integrated circuit, the method comprising:
   receiving, at a buffer of a System-on-Chip ("SoC"), a plurality of packets for output;
   determining that there is a transmission bandwidth bottleneck;
   in response to the determining that there is a transmission bandwidth bottleneck, determining, when a respective packet among the plurality of output packets is received, whether the buffer has reached a predetermined capacity; and
   in response to determining that the buffer has not reached the predetermined capacity:
   transmitting the respective packet among the plurality of packets, as the respective packet is received and prior to processing, wherein the transmitting comprises of:
   generating a respective header comprising an address for the respective packet among the plurality of packets;
   determining whether the combined size of the respective header plus the size of a payload of a given packet exceeds a maximum packet size;
   in response to determining that the combined size does exceed the maximum packet size:
   generating a second header;
   transmitting the first header and a portion of the payload together in a first line; and
   transmitting the second header and a remainder of the payload together in a second line.

2. The method of claim 1, wherein the buffer comprises a plurality of sub-buffers, such that a respective sub-buffer among the plurality of sub-buffers corresponds to a different characteristic, and wherein determining whether the buffer has reached a predetermined capacity comprises determining whether a sub-buffer of the plurality of sub-buffers has reached the predetermined capacity.

3. The method of claim 1, wherein determining that there is a transmission bandwidth bottleneck comprises determining a reduction in available bandwidth.

4. A system for aggregating packets and transmitting the aggregated packets to a device in an integrated circuit, the system comprising:
   a System-on-Chip ("SoC") comprising:
      a buffer; and
      control circuitry configured to:
   detect that the SoC has received, at the buffer, a plurality of packets for output,
   determine that there is a transmission bandwidth bottleneck,
   in response to determining that there is a transmission bandwidth bottleneck, determine, when a respective packet among the plurality of output packets is received, whether the buffer has reached a predetermined capacity, and
   in response to determining that the buffer has not reached the predetermined capacity:
   transmit the respective packet among the plurality of packets, as the respective packet is received and prior to processing, wherein the control circuit, when transmitting the packet, is further configured to:
   generate a respective header comprising an address for the respective packet among the plurality of packets;
   determine whether the combined size of the respective header plus the size of a payload of a given packet exceeds a maximum packet size;
   in response to determining that the combined size does not exceed the maximum packet size, transmit the header and the payload together in a single line; and
   in response to determining that the combined size does exceed the maximum packet size:
   generate a second header;
   transmit the first header and a portion of the payload together in a first line; and
   transmit the second header and a remainder of the payload together in a second line.

5. The system of claim 4, wherein the buffer comprises a plurality of sub-buffers, such that a respective sub-buffer among the plurality of sub-buffers corresponds to a different characteristic, and wherein the control circuitry is further configured, when determining whether the buffer has reached a predetermined capacity, to determine whether a sub-buffer of the plurality of sub-buffers has reached the predetermined capacity.

6. The system of claim 4, wherein the control circuitry, when determining that there is a transmission bandwidth bottleneck, is configured to:
   determine a reduction in available bandwidth.

* * * * *